Dec. 2, 1930.  A. C. SLADKY  1,783,631
INSECT TRAP
Filed Feb. 25, 1930
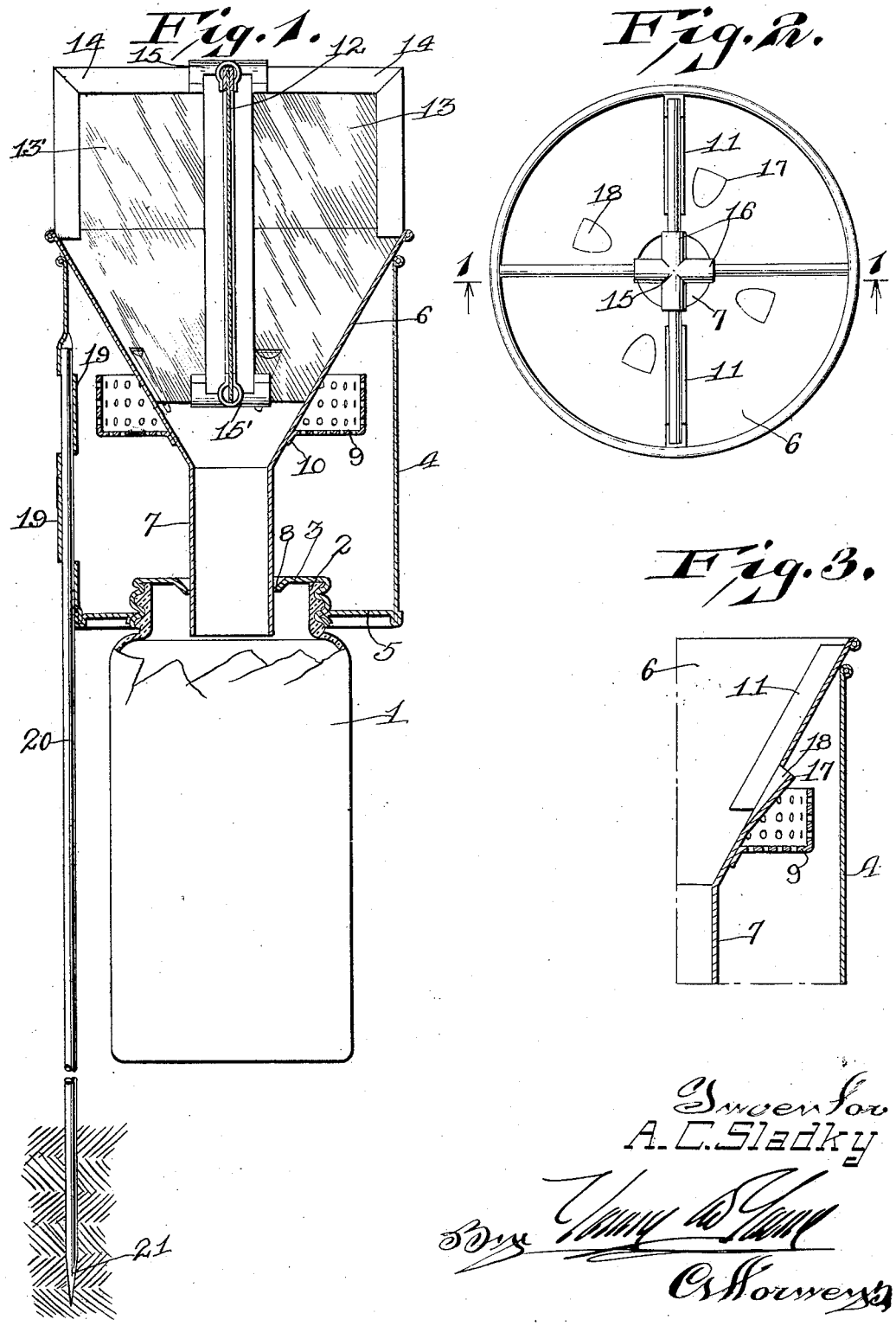

Patented Dec. 2, 1930

1,783,631

UNITED STATES PATENT OFFICE

ALEXANDER C. SLADKY, OF MILWAUKEE, WISCONSIN, ASSIGNOR TO NATIONAL ENAMELING AND STAMPING COMPANY, OF MILWAUKEE, WISCONSIN

INSECT TRAP

Application filed February 25, 1930. Serial No. 431,128.

This invention relates to improvements in insect traps.

One of the objects of my invention is the provision of a new and improved type of trap or catcher which is particularly adapted for trapping and catching what is known as Japanese beetles, particularly found in large numbers in the New England States and other parts of this country, whereby the insect is attracted by a suitable extract, or the like, which gives off an odor particularly attractive to this type of insect, and through the attractiveness of this odor, the insect will strike an unseen object and be stunned to such an extent that it will have a tendency to drop downwardly in a receptacle in position for the purpose of receiving the same and wherein it will be rather difficult for the insect to escape.

Another object of the invention is the provision of an insect trap of the above character which includes a receptacle having a funnel-shaped member extending into the same, and transparent plates arranged at right angles to each other at the upper end of the funnel-shaped member which will be practically invisible to the insect; and adjacent the funnel-member is arranged a receptacle for material embodying an odor which will attract the insect so that the insect in being attracted by the odor will have a tendency to strike the transparent objects and become stunned, whereafter they will drop downwardly through the funnel-shaped member into the receptacle.

A further object of the invention is the provision of an insect trap of the above character, provided with means for supporting the article above the ground and in such position that it will readily attract the insect toward the transparent obstructions and through the engagement of these obstructions, the insect is rendered helpless through engagement of these transparent obstructions so that it will readily drop downwardly into the trap.

With the above and other objects in view, the invention consists in the novel features of construction, the combination and arrangement of parts hereinafter more fully set forth, pointed out in the claims and shown in the accompanying drawings wherein:

Figure 1 is a vertical sectional view through my improved insect trap;

Figure 2 is a top plan view; and

Figure 3 is a detail vertical section through one side of the device.

In carrying out my invention, I provide a receptacle 1, which may be of substantially suitable size and shape and provided at its upper end with a restricted exteriorly threaded neck 2, having a cover 3 engaged therewith. Mounted upon the receptacle is a housing 4, the bottom of which is cut out to receive the neck 2 with the threaded portion of the cover adjusted to receive the material around the opening in the bottom 5 which is forced into one of the threaded grooves of the cover, as shown in Figure 1, so as to securely support the housing 4 upon the receptacle.

Positioned within the receptacle 4 is a funnel 6 engaging the upper edge of the receptacle at a point adjacent the upper edge of the funnel, while the lower portion of the funnel is provided with a tubular extension 7 which leads downwardly through an opening 8 in the cover member 3. The tube 7 extends through the cover a suitable distance so that a portion of the tube projects into the receptacle 1, thus having the inner end of the tube member 7 spaced from the walls of the receptacle to prevent the insects trapped in the receptacle from reaching the lower end of the tube and thus prevent their escape.

Surrounding the funnel member 6 adjacent its lower end is an annular perforated receptacle 9 having an annular flange 10 adapted to be soldered or otherwise secured to the lower end of the funnel for supporting the foraminous receptacle 9 in position, as shown in Figure 1.

At diametric points within the funnel 6, I provide the channel guides 11 adapted to receive the lower tapered portion of the transparent panel 12. This panel 12 is of substantially the same width as the diameter of the largest portion of the funnel, with the lower edge of the panel tapered to correspond with the tapering portion of the funnel.

Arranged at right angles to the panel 12 are the sections 13 and 13′ which form a second panel, as shown in Figure 1, and these panel sections 13 and 13′ are provided with a reenforcing metal strip 14 which extends around the edges thereof and down along the opposite faces of the panel 12. The panels are held in position by means of the clips 15 and 15′ which are each formed of a separate piece of material and provided with angularly disposed wing portions 16 which engage over the upper and lower edges respectively of the panel 12, and the panel sections 13 and 13′, to hold these members in their correct positions relative to each other so that the panel sections 13 and 13′ will be disposed at right angles to the panel 12, as illustrated in Figure 2.

When it is desired to use the device, the foraminous receptacle 9 is filled with sawdust or similar material and this material is then saturated with an attractive odor, such as oil of geranium, and through the attractiveness of this odor, the insects will fly toward the same and in doing so, will strike the transparent panels 12, 13, 13′, thus rendering the insect temporarily helpless so that they will have a tendency to drop downwardly through the tube 7 into the receptacle 1, and due to the fact that the lower end of the tube 7 extends down into the receptacle beyond the cover 3, it will be rather difficult for the insect to escape from the receptacle.

In order that the odor from the material within the receptacle 9 may escape through the funnel 6, I provide the funnel at annularly arranged points, with cut out portions 17 adapted to be bent outwardly as shown at Figure 3, to form passages 18 whereby the odor from the material in the receptacle 9 will pass out into the funnel 6 and thus attract the insects toward the transparent panels.

It is preferable that this trap be placed in orchards or where there is foliage, and it is preferred to support this trap slightly above the ground, and with this end in view, I cut out from the receptacle 4 a plurality of oppositely disposed portions 19, through which is threaded the upper end of a rod 20, the lower end of the rod being tapered, as shown at 21, so that it can be readily pushed into the ground. This rod 20 may be of any suitable height and can be easily threaded between the oppositely disposed portions 19.

In constructing an insect trap along this line, particular attention is directed to the relative position of the transparent panels, wherein these panels lie in right angles to each other, so that regardless of the direction in which the insect approaches the trap, it will necessarily strike against one of these panels if it passes above the upper mouth of the funnel, and due to the fact that the odor from the material in the foraminous receptacle 9 is escaping up through the funnel, the insect will naturally have a tendency to direct its course toward these transparent panels, and as they strike the panels they will be rendered sufficiently helpless so that they will drop downwardly in the receptacle 1.

It will be noted that by stamping the portions 17 from the body of the funnel, it will prevent water from entering the material in the foraminous receptacle 9, as any water from rain, or the like, will pass downwardly over the outlets 18 into the receptacle 1.

While I have shown and described the preferred embodiment of my invention, it will be apparent that slight changes may be made in the construction when putting the invention into practice without departing from the spirit of the same or the scope of the appended claims.

I claim:

1. A device of the class described including a receptacle, a housing mounted upon the receptacle, a funnel-shaped member supported by the housing and having its restricted end portion extending into the receptacle, a bait receptacle carried by the funnel member, said funnel member having passageways formed therein above the bait receptacle, and a plurality of transparent obstructions supported at the open mouth of the funnel and extending above the same.

2. In a device of the class described, a receptacle, a funnel-shaped member supported in the receptacle with its restricted part extending into the receptacle, said funnel having a plurality of passageways formed therein, above its restricted portion, a bait receptacle carried by the funnel member adjacent the passageways, and a plurality of transparent obstructions arranged at an angle relative to each other and supported at the open mouth of the funnel with the upper ends of said obstructions extending above the edge of the funnel.

3. A device of the class described including a receptacle, a funnel-shaped member supported above the receptacle with its restricted end portion extending into the receptacle, a bait receptacle supported by the funnel around the exterior thereof, a plurality of passageways struck out from the funnel toward the exterior thereof, at a point adjacent the bait receptacle to prevent the passage of water through said passageways into the bait receptacle, and a plurality of transparent obstructions supported at the open mouth of the funnel and extending above the same.

4. An insect trap including a receptacle, a receiving member supported above the receptacle and leading into the same, a bait receptacle carried by the receiving member, a plurality of struck out portions in the receiving member above the bait receptacle so positioned as to prevent entrance of water or the like into the bait receptacle, and a baffle member supported by the receiving member and extending above the same.

In testimony that I claim the foregoing I have hereunto set my hand at Milwaukee, in the county of Milwaukee and State of Wisconsin.

ALEXANDER C. SLADKY.